(12) United States Patent
Nakanishi

(10) Patent No.: US 10,416,673 B2
(45) Date of Patent: Sep. 17, 2019

(54) AUTONOMOUS TRAVELING BODY AND VACUUM CLEANER

(71) Applicant: TOSHIBA LIFESTYLE PRODUCTS & SERVICES CORPORATION, Kawasaki-shi (JP)

(72) Inventor: Syu Nakanishi, Ome (JP)

(73) Assignee: TOSHIBA LIFESTYLE PRODUCTS & SERVICES CORPORATION, Kawasaki-shi (JP)

( * ) Notice: Subject to any disclaimer, the term of this patent is extended or adjusted under 35 U.S.C. 154(b) by 160 days.

(21) Appl. No.: 15/503,867

(22) PCT Filed: Aug. 21, 2015

(86) PCT No.: PCT/JP2015/073520
§ 371 (c)(1),
(2) Date: Feb. 14, 2017

(87) PCT Pub. No.: WO2016/031706
PCT Pub. Date: Mar. 3, 2016

(65) Prior Publication Data
US 2017/0235309 A1 Aug. 17, 2017

(30) Foreign Application Priority Data
Aug. 29, 2014 (JP) .................... 2014-176425

(51) Int. Cl.
*G05D 1/02* (2006.01)
*A47L 9/04* (2006.01)
*A47L 9/28* (2006.01)

(52) U.S. Cl.
CPC .............. *G05D 1/02* (2013.01); *A47L 9/04* (2013.01); *A47L 9/28* (2013.01); *A47L 9/2873* (2013.01);
(Continued)

(58) Field of Classification Search
CPC .. A47L 2201/022; A47L 2201/04; A47L 9/04; A47L 9/28; A47L 9/2873; A47L 9/2884; G05D 1/02
See application file for complete search history.

(56) References Cited

U.S. PATENT DOCUMENTS

| | | | | |
|---|---|---|---|---|
| 5,621,291 | A | * | 4/1997 | Lee ................ A47L 5/30 180/167 |
| 5,804,942 | A | * | 9/1998 | Jeong ............. G05D 1/0255 318/580 |

(Continued)

FOREIGN PATENT DOCUMENTS

| | | |
|---|---|---|
| CN | 101278820 A | 10/2008 |
| CN | 101945606 A | 1/2011 |

(Continued)

OTHER PUBLICATIONS

JP—2014223162—A—Dec. 2014—English Machine Translation (Year: 2014).*

(Continued)

*Primary Examiner* — Marc Carlson
(74) *Attorney, Agent, or Firm* — Oblon, McClelland, Maier & Neustadt, L.L.P.

(57) ABSTRACT

A vacuum cleaner capable of smoothly traveling along an obstacle. A control unit has modes of travel control and directional change control. In the travel control, while a distance between a main casing and a sideward obstacle detected by a distance measuring sensor is kept within a specified distance range, a motor is driven so as to make the main casing travel along the obstacle. In the directional change control, when an obstacle forward of the main casing is detected by a contact sensor during the travel control, the motor is driven so as to make the main casing change in advancing direction along the detected forward obstacle. The directional change control includes at least swing con-
(Continued)

trol for driving the motor so as to make the main casing swing to a specified swing angle while disregarding a distance detected by the distance measuring sensor.

7 Claims, 9 Drawing Sheets

(52) U.S. Cl.
CPC ....... *A47L 9/2884* (2013.01); *A47L 2201/022* (2013.01); *A47L 2201/04* (2013.01)

(56) References Cited

U.S. PATENT DOCUMENTS

| | | | |
|---|---|---|---|
| 6,809,490 | B2 | 10/2004 | Jones et al. |
| 7,173,391 | B2 | 2/2007 | Jones et al. |
| 8,457,789 | B2 | 6/2013 | Hong |
| 2003/0025472 | A1 | 2/2003 | Jones et al. |
| 2004/0207355 | A1 | 10/2004 | Jones et al. |
| 2005/0237188 | A1 | 10/2005 | Tani |
| 2007/0267570 | A1 | 11/2007 | Park et al. |
| 2008/0249661 | A1 | 10/2008 | Hong |
| 2017/0181593 | A1* | 6/2017 | Ichikawa ................. A47L 9/04 |

FOREIGN PATENT DOCUMENTS

| | | | |
|---|---|---|---|
| CN | 103584798 A | | 2/2014 |
| JP | 11-212642 A | | 8/1999 |
| JP | 11212642 A | * | 8/1999 |
| JP | 2004-522231 A | | 7/2004 |
| JP | 2007-272677 A | | 10/2007 |
| JP | 2012-64240 A | | 3/2012 |
| JP | 2012-185776 A | | 9/2012 |
| JP | 2013-106820 A | | 6/2013 |
| JP | 2013-235351 A | | 11/2013 |
| JP | 2014-71691 A | | 4/2014 |
| JP | 2014223162 A | * | 12/2014 |
| WO | WO 2009/101775 A1 | | 8/2009 |

OTHER PUBLICATIONS

JP—11212642—A—Aug. 1999—English Machine Translation (Year: 1999).*

International Search Report dated Sep. 29, 2015 in PCT/JP2015/073520 filed Aug. 21, 2015.

* cited by examiner

AUTONOMOUS TRAVELING BODY AND VACUUM CLEANER

CROSS-REFERENCE TO RELATED APPLICATIONS

The present application is a National Stage Application of PCT/JP2015/073520 filed on Aug. 21, 2015. The PCT application acclaims priority to Japanese Patent Application No. 2014-176425 filed on Aug. 29, 2014. All of the above applications are herein incorporated by reference.

FIELD

Embodiments described herein relate generally to an autonomous traveling body capable of autonomously traveling, as well as to a vacuum cleaner.

BACKGROUND

Conventionally, there has been known an autonomous traveling body such as a cleaning robot or a monitoring robot which autonomously travels by avoiding an obstacle and keeping along a wall while detecting obstacles, walls and the like by using a sensor, as an example.

Such an autonomous traveling body described above, when traveling along a wall and detecting another wall intersecting (orthogonally crossing) the wall in front, changes its advancing direction to travel along the newly detected wall. At the time of a change in the advancing direction, since the autonomous traveling body measures an angle of the wall by a sensor or the like to determine a new advancing direction based on the measured information, time is required for the directional change, because of which the autonomous traveling body may not only be unable to fulfil a smooth operation but also, in some cases, result in a misdetection by the sensor.

For these reasons, there has been a desire for an autonomous traveling body which travels more smoothly along a wall or the like.

CITATION LIST

Patent Literature

PTL 1: Japanese Laid-open Patent Publication No. 2012-185776

Technical Problem

An object of the present invention is to provide an autonomous traveling body, as well as a vacuum cleaner, capable of traveling smoothly along an object.

Solution to Problem

An autonomous traveling body in one aspect of the invention has a main casing. The autonomous traveling body also has driving wheels for making the main casing travel. The autonomous traveling body further has a motor for driving the driving wheels. The autonomous traveling body has a distance measuring sensor for detecting a distance to an object located sideward of the main casing. The autonomous traveling body also has an object sensor for detecting an object located forward of the main casing. Further, the autonomous traveling body has a control unit for controlling drive of the motor to make the main casing autonomously travel. The control unit includes travel control and directional change control. In the travel control, while a distance between the main casing and a sideward object detected by the distance measuring sensor is kept within a specified distance range, the motor is driven so as to make the main casing travel along the object. In the directional change control, when an object forward of the main casing is detected by the object sensor during the travel control, the motor is driven so as to make the main casing change in advancing direction along the detected forward object. The directional change control includes at least swing control for driving the motor so as to make the main casing swing to a specified swing angle while disregarding a distance detected by the distance measuring sensor.

BRIEF DESCRIPTION OF DRAWINGS

FIGS. 4A to 4C show cases in which a forward object extends in an orthogonal direction and FIGS. 4D to 4F show cases in which a forward object extends in a skewed direction.

DETAILED DESCRIPTION

Hereinbelow, a first embodiment of the invention will be described in terms of its configuration with reference to the accompanying drawings.

In FIGS. 1A, 1B, 1C, 1D, 1E and 1F and 2, reference sign 11 denotes a vacuum cleaner. This vacuum cleaner 11 is a so-called self-propelled robot cleaner that, while autonomously traveling (self-propelled to travel) on a cleaning-object surface (floor surface), cleans the cleaning-object surface.

The vacuum cleaner 11 includes a vacuum cleaner main body 12 which is an autonomous traveling body, and side brushes 13 which are swinging cleaning parts as side portion cleaning means (side portion cleaning parts) attached to the vacuum cleaner main body 12.

Figure 2A:
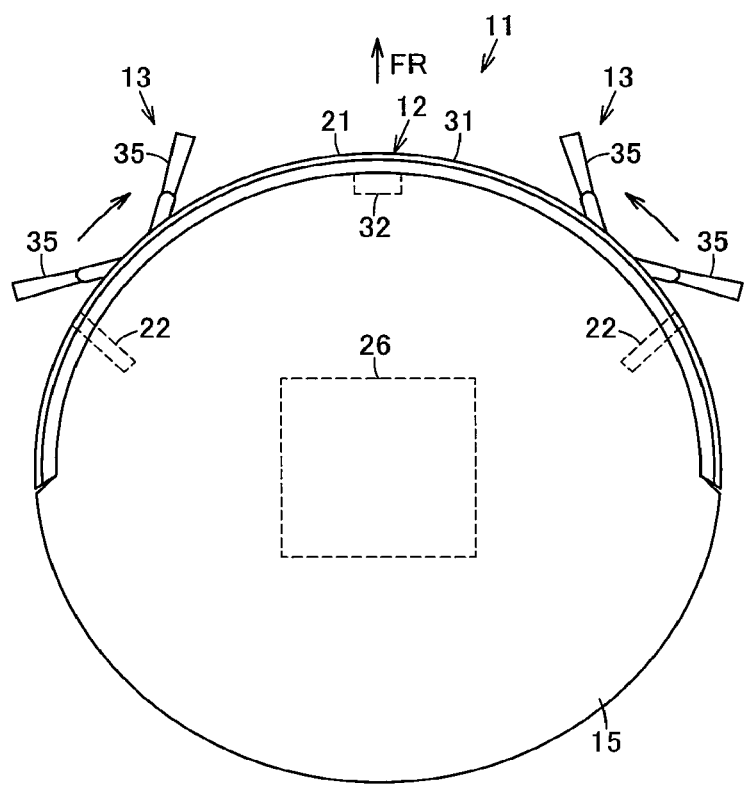
FIG. 2A is a plan view showing the same vacuum cleaner as viewed from above.
Figure 2B:
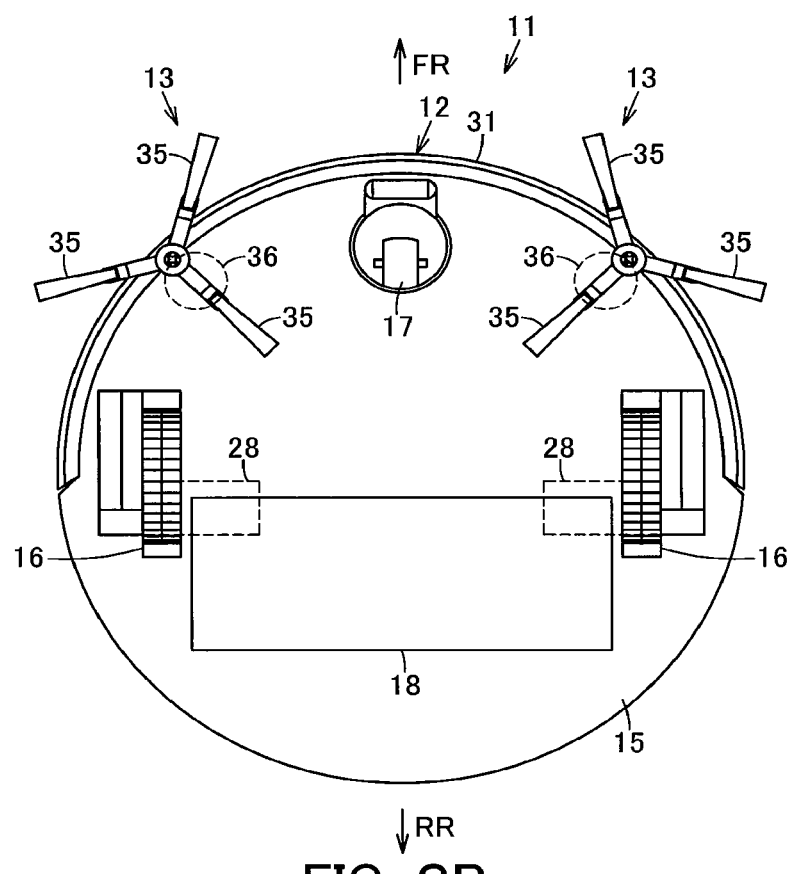
FIG. 2B is a plan view of the same vacuum cleaner as viewed from below.

The vacuum cleaner main body 12 includes a hollow main casing 15. In a lower part of the main casing 15 facing the cleaning-object surface, for example, driving wheels 16 as a plurality (pair) of driving parts, a driven wheel 17, the side brushes 13, a suction port 18 which is a dust collecting port for dust collecting use, an exhaust port (not shown), and the like are disposed (FIG. 2B). Also, in an outer side portion of the main casing 15, a contact sensor 21 being an object detection means (obstacle detection means (obstacle sensor)) for detecting an obstacle W which is a forward object, distance measuring sensors 22 being distance detection means (distance detection parts) for detecting a distance between the main casing 15 and a sideward obstacle W, and the like are disposed. Then, an electric blower (not shown), a dust collecting unit (not shown) communicating with both a suction side of the electric blower and the suction port 18, a control unit (controller) 26 as a control means composed of a circuit board or the like, a secondary battery (not shown) serving as a power supply unit for supplying electric power to the electric blower, the control unit 26 or the like, and others are disposed inside the main casing 15 (FIG. 2A). In addition, the following description will be given on the assumption that a direction along the traveling direction of the vacuum cleaner 11 (main casing 15) is assumed as a back-and-forth direction (directions of arrows FR and RR shown in FIGS. 2A and 2B) while a left-and-right direction (directions toward both sides) intersecting (orthogonally crossing) the back-and-forth direction is assumed as a widthwise direction, and a state in which the vacuum cleaner 11 is placed on a flat cleaning-object surface is assumed as a reference state.

The main casing 15 is formed into a flat columnar shape (disc shape) or the like by combining a plurality of casing bodies formed from a hard synthetic resin or the like as an example.

The driving wheels 16, 16 enable the main casing 15 to travel (autonomously travel) on the cleaning-object surface, i.e. are intended for traveling use. The driving wheels 16, 16, each formed into a disc shape having a rotational axis along the horizontal direction (widthwise direction), are disposed apart from each other in the widthwise direction at positions near a back-and-forth direction center in a lower part of the main casing 15. Then, these driving wheels 16, 16 are rotationally driven via motors 28, 28 as drive means (driver members).

These motors 28, 28 are connected to the driving wheels 16, 16, respectively, via gearboxes as unshown drive transmission means (drive transmission parts). Then, the operation of these motors 28, 28 is controlled separately from each other by the control unit 26, making it possible to drive the driving wheels 16, 16 independently of each other.

The driven wheel 17 is disposed, so as to be rotatable as required, at a position in a lower part of the main casing 15 where the weight of the vacuum cleaner 11 can be supported with good balance together with the driving wheels 16, 16. In this embodiment, the driven wheel 17 is a swing wheel swingably attached at the central portion in the left and right direction and at the front portion of the main casing 15.

The suction port 18 is positioned, between the driving wheels 16, 16, at a generally widthwise central portion of the main casing 15 and rather rearward in the back-and-forth direction (forward of the dust collecting unit) and is formed into a quadrilateral shape being longitudinal in the widthwise direction, i.e., long sideways. In this suction port 18, a rotary cleaner member (rotary brush) which is rotationally driven to scrape up dust and dirt to the dust collecting unit may be attached. In this case, a constitution for sucking up dust and dirt by negative pressure through the suction port 18, i.e., such a constitution as including an electric blower and an air flow path communicating with the electric blower, and the like may be omitted.

The electric blower is housed in the main casing 15 at a position between the driving wheels 16, 16 as an example. The suction side of the electric blower is airtightly connected to the dust collecting unit while its exhaust side is airtightly connected to an exhaust port.

The dust collecting unit, which is to internally accumulate dust and dirt sucked through the suction port under drive of the electric blower, is provided in this embodiment as a dust collecting box removably fittable to the main casing 15.

The contact sensor 21 includes a bumper 31 which is a contactor forming a front-side half of an outer circumference of the main casing 15, and a sensor body 32 as a detection means body (detection part body) such as a switch which is to be pressed and actuated by movement of the bumper 31. That is, the contact sensor 21 is a switch-type bumper sensor.

The bumper 31, which is formed so as to be curved in a circular-arc shape from a hard synthetic resin or the like as an example, is biased by an unshown biasing means (biaser) such as a spring in such a direction as to protrude forward from the main casing 15.

The sensor body 32 is disposed, for example, at a front portion of the main casing 15. Then, the sensor body 32, facing a rear portion of the bumper 31, detects contact of the bumper 31 with an obstacle W by being pressed by the bumper 31 when the bumper 31 is actuated against the biasing of the biasing means.

The distance measuring sensors 22, each being a noncontact type sensor such as an infrared sensor (optical sensor) as an example, are disposed at both-side portions of the outer circumference of the main casing 15 and are enabled to detect the distance between the obstacles W located obliquely forward of the main casing 15 and the main casing 15, respectively and independently of each other. In this embodiment, the distance measuring sensors 22, 22 are so configured as to detect distances to the obstacles W on oblique both sides of a front side of the main casing 15 (in directions parallel to left-and-right 45° forward directions of the main casing 15). A position of an obstacle W whose distance is to be detected by these distance measuring sensors 22 is behind a front end portion of the bumper 31 of the contact sensor 21.

Meanwhile, the side brushes 13 are to scrape together and clean dust and dirt located at positions to which the suction port 18 does not reach, on both sides of the suction port 18, particularly positions outside the outer frame of the main casing 15 or positions forward of the driving wheels 16 such as the vicinity of an obstacle W or the like. In this embodiment, the side brushes 13 are disposed, for example, at positions on widthwise both sides of the main casing 15, in this embodiment at oblique both-side positions (in forward left-and-right 45° directions of the main casing 15) forward of a back-and-forth direction of a central portion of the main casing 15. Each of these side brushes 13, including cleaner members 35 rotatably (swingably) disposed in a lower part facing the cleaning-object surface, scrapes off dust and dirt on the cleaning-object surface when the cleaner members 35 are rotationally driven generally parallel to the cleaning-object surface by a swing motor 36 as a swing driving means (swing drive member).

The cleaner members 35, which are brush bristles each formed in a linear shape as an example, are disposed radially in plural quantities for each side brush 13.

The swing motor 36 is so configured as to rotate the cleaner member 35 parallel to the cleaning-object surface, i.e., to swing the cleaner member 35. In this embodiment, the swing motors 36, 36 swing the cleaner members 35, 35 in mutually opposite directions so that dust and dirt on forward both sides of the main casing 15 are scraped together toward the widthwise center side (suction port 18 side) of the main casing 15. That is, one swing motor 36 of the side brush 13 positioned on the left side swings the cleaner member 35 clockwise (rightward turn) while the other swing motor 36 of the side brush 13 positioned on the right side swings the cleaner member 35 counterclockwise (leftward turn).

The control unit 26 includes a clock means (clock part) such as a timer, a storage means (storage part) such as memory, and a control unit body such as a microcomputer (CPU), for example. The control unit 26 is electrically connected to the electric blower, the contact sensor 21 (sensor body 32), the distance measuring sensors 22, each motor 28, each swing motor 36, and the like. Thus, the control unit 26 reads, in real time, detection values obtained by the contact sensor 21 and the distance measuring sensors 22 and moreover controls the drive of the driving wheels 16, 16 via the motors 28, 28 based on the read detection results. By this control, it becomes possible that the main casing 15 (vacuum cleaner 11) is made to autonomously travel so as to avoid obstacles W while the drive of the electric blower and each swing motor 36 and the like is controlled so as to make the vacuum cleaner 11 fulfill cleaning. Further, the control unit 26 has at least two modes of control; travel control and directional change control, the travel control being such that the motors 28 are driven so as to make the main casing 15 travel along a sideward obstacle W while a distance between the main casing 15 and the obstacle W detected by the distance measuring sensor 22 (distance in a direction corresponding to a position of the distance measuring sensor 22 (i.e., direction toward which the distance measuring sensor 22 is directed)) is kept within a specified distance range L, and the directional change control being such that when an obstacle W forward of the main casing 15 is detected by the contact sensor 21 during the travel control, the motors 28 are driven so as to make the main casing 15 change its advancing direction along the detected forward obstacle W. The travel control and the directional change control will be described later.

The secondary battery supplies electric power to the control unit 26, the electric blower, the contact sensor 21, the distance measuring sensors 22, the motors 28, 28, the swing motors 36, 36 and the like. The secondary battery is electrically connected to a charging terminal positioned in a lower part of the main casing 15, thus enabled to fulfill charging when its charging terminal is connected to an unshown specified charging stand provided at a specified position indoors (in a room) as an example.

Next, operation of the above-described first embodiment will be described.

For example, when time has come to a specified time preset in the control unit 26 or the like, the vacuum cleaner 11 makes the electric blower be driven to start cleaning while being separated from the charging stand as an example. In addition, the start position for cleaning may be set to any arbitrary place such as a traveling start position of the vacuum cleaner 11 or an entrance of the room or the like.

With this vacuum cleaner 11, the control unit 26 drives the electric blower and each swing motor 36 and moreover monitors the position and traveling state of the vacuum cleaner 11 by detecting distances to various obstacles W such as a wall surrounding a cleaning area, installed objects such as furniture, copiers, etc. installed in a room, table legs or chairs, and the like, for example, via the contact sensor 21 and the distance measuring sensors 22. Under these conditions, each motor (driving wheel 16) is driven in response to detection from the contact sensor 21 and the distance measuring sensors 22, thus allowing the vacuum cleaner 11 to travel on the cleaning-object surface while avoiding obstacles W.

For example, for cleaning of the cleaning-object surface in the vicinity of an obstacle (wall portion) W, the distance measuring sensor 22 detects a distance between the main casing 15 and this obstacle W, and the control unit 26 drives the motors 28 so that the detected distance is kept within the specified distance range L (specified constant value) (travel control (FIG. 1A)). Under this control, while the vacuum cleaner 11 is traveling along the obstacle W, the cleaner members 35 of one side brush 13 positioned on the obstacle W side are swung by the swing motor 36, by which dust and dirt on the cleaning-object surface in the vicinity of the obstacle W are scraped up. The specified distance range L is set to such a distance range that the side brush 13 (cleaner members 35) comes close enough to a sideward obstacle W and yet does not contact the sideward obstacle W. Then, this travel control is continued until the contact sensor 21 detects a forward obstacle W.

Figure 1A:
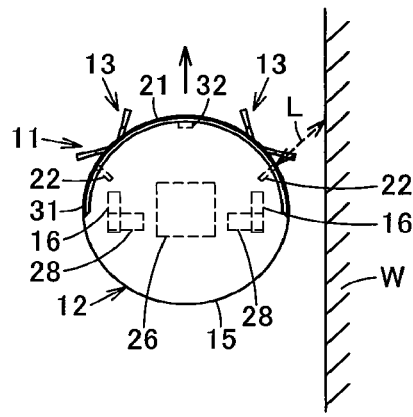
FIGS. 1A, 1B, 1C, 1D, 1E and 1F are explanatory plan views schematically showing, in an order of FIGS. 1A to 1F, travel control and directional change control of a vacuum cleaner including an autonomous traveling body of a first embodiment.
Figure 1B:
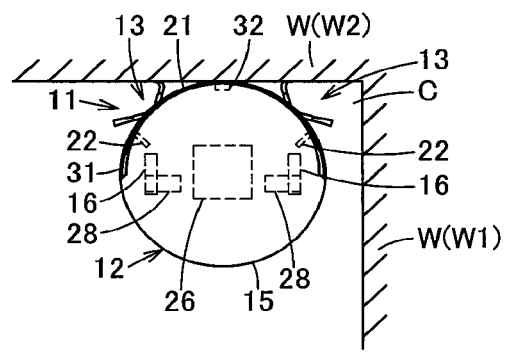
Figure 3:
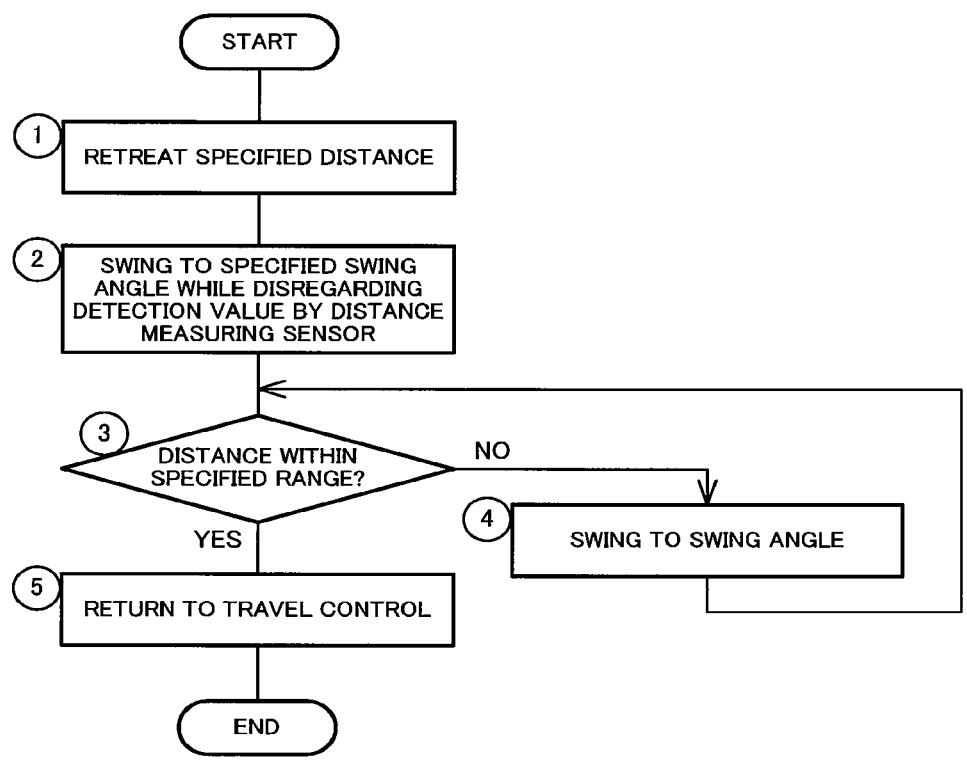
FIG. 3 is a flowchart showing part of control of the same vacuum cleaner.

Then, when an obstacle W (obstacle W2) that extends in a direction intersecting (orthogonally crossing) a sideward obstacle W (obstacle W1) is present forward of the main casing 15 (vacuum cleaner 11), the vacuum cleaner 11 travels straight until the contact sensor 21 detects the obstacle W (obstacle W2), in this embodiment, until the bumper 31 of the contact sensor 21 comes into contact (collides) with the obstacle W (obstacle W2) (FIG. 1B). By this contact (collision) of the bumper 31 with the obstacle W (obstacle W2), the obstacle W (obstacle W2) is detected, so that the control unit 26 is changed over from the travel control to the directional change control shown in the flowchart of FIG. 3. The backward movement of the bumper 31 against the biasing force as in this case causes the cleaner members 35 of the side brush 13 to be relatively moved to the cleaning-object surface of a corner portion (angular portion) C surrounded by the obstacles W, W (obstacles W1, W2), thereby scraping off dust and dirt on this cleaning-object surface.

Figure 1C:
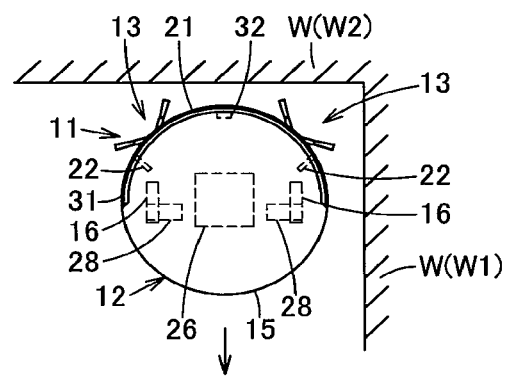

Thereafter, the control unit 26 drives the motors 28 so as to make the main casing 15 retreat to a specified distance (retreat control), so that the contact sensor 21 (bumper 31) is separated from the obstacle W (obstacle W2) (FIG. 1C, step 1). This specified distance is set, for example, to such a distance that the obstacle W (obstacle W2) and the main casing 15 are kept from contacting each other when the main casing 15 is swung. At this time, the bumper 31 of the contact sensor 21 separated from the obstacle W (obstacle W2) is returned to its original position by the biasing of the biasing means.

Figure 1D:
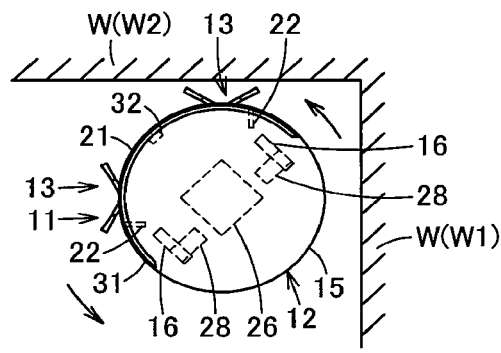
Figure 1E:
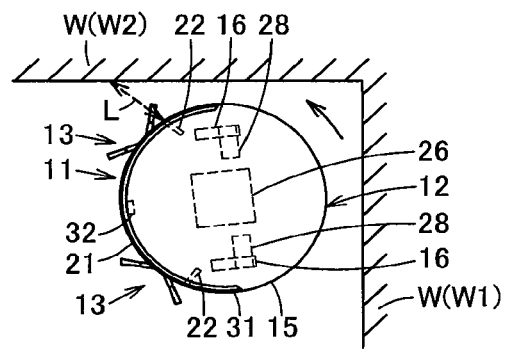
Figure 1F:
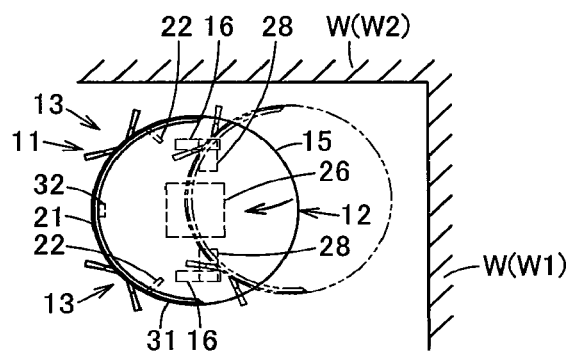

Next, while disregarding (without reading) a distance detected by the distance measuring sensor 22, i.e. a detection value of the distance measuring sensor 22, the control unit 26 performs swing control for swinging to a constant specified swing angle (the same angle as the position of the distance measuring sensor 22 in the main casing 15 (an angle of a direction toward which the distance measuring sensor 22 is directed relative to the forward direction of the main casing 15)), which is 45° as an example. This swing angle is set in correspondence to the position of the distance measuring sensor 22 in the main casing 15 (an angle of a direction toward which the distance measuring sensor 22 is directed relative to the forward direction of the main casing 15) (FIG. 1D, step 2). Subsequently, the control unit 26 reads a detection value of the distance measuring sensor 22 to decide whether or not the distance detected by the distance measuring sensor 22 is within the same specified distance range L (specified constant value) as in the travel control (step 3). Then, if it is decided at this step 3 that the distance is not within the specified distance range L, then the control unit 26 further drives the motors 28 to make the main casing 15 (vacuum cleaner 11) swing to a specified angle (FIG. 1E, step 4), returning to step 3. The specified angle for swinging in this step 4 is set to a very small angle, e.g. 1° or so, smaller than the specified swing angle in step 2. Also, if it is decided at step 3 that the distance is within the specified distance range L, it is considered that preparations have been made for traveling in the same manner as when traveling along the obstacle W1, and the control unit 26 returns to travel control (FIG. 1F, step 5). In addition, the swing direction in step 2 and step 4 is set to a direction of separation from the obstacle W (obstacle W1), i.e., a direction toward one side opposite to the side on which the distance has been detected by the distance measuring sensor 22 during the travel control. Also, since the decision at step 3 is made instantaneously, the swing in step 2 and the swing in step 4 are continuously performed. The swing, in this embodiment, is a so-called spin turn, which means that, for example, one driving wheel 16 (motor 28) and another driving wheel 16 (motor 28) are rotated in mutually opposite directions so that the main casing 15 is rotated at an unchanged position without changing its center position. Alternatively, the swing may also be a circular motion with a specified small radius.

The vacuum cleaner 11 sucks dust and dirt on the cleaning-object surface faced by the suction port 18 or dust and dirt scraped together by the side brushes 13 along with air through the suction port 18 on which a negative pressure generated by the drive of the electric blower has acted.

Dust and dirt sucked through the suction port 18 is introduced and collected into the dust collecting unit. Moreover, air from which dust and dirt has been isolated is sucked into the electric blower and cools the electric blower to thereafter become exhaust air, which is exhausted outside the main casing 15 through the exhaust port.

Upon a decision that the cleaning of the cleaning area has been completed, the control unit 26 makes the vacuum cleaner 11 autonomously travel up to the charging stand position, then stops the electric blower and the like and moreover makes the charging terminal connect (physically and electrically) to the charging stand to stop the motors 28, 28 and the like, thereby ending the operation to charge the secondary battery.

According to the first embodiment, as described above, the control unit 26 includes the swing control in which the control unit 26, while disregarding the distance detected by the distance measuring sensor 22 in the directional change control, drives the motors 28 so as to make the main casing 15 swing to an angle (e.g., 45°) set in correspondence to the position of the distance measuring sensor 22 in the main casing 15 so that the main casing 15 is directed toward a direction opposite to the direction of distance detection by the distance measuring sensor 22 during the travel control. Thus, the distance measuring sensor 22 can be directed toward the obstacle W (obstacle W2) reliably without requiring any complex control, so that the main casing 15 can be made to travel smoothly so as to go along the obstacle W (obstacle W2).

Consequently, in this embodiment, since each distance measuring sensor 22 is disposed so as to face a direction parallel to a direction of 45° relative to the forward direction that is the advancing direction of the vacuum cleaner 11 (main casing 15), swinging the main casing 15 by 45° in the directional change control causes the distance measuring sensor 22 to generally vertically face the obstacle W (obstacle W2) head on. Thus, the distance measuring sensor 22 is enabled to detect the distance between the main casing 15 and the obstacle W (obstacle W2) more reliably, and after the directional change control, the travel control for traveling along the obstacle W (obstacle W2), while keeping the specified distance range L, can be carried out reliably.

In addition, in the above-described first embodiment, the specified swing angle in the swing control during the directional change control is not limited to 45°, and may be set arbitrarily in accordance with a position (an angle at which the distance measuring sensor 22 is directed) of the distance measuring sensor 22 in the main casing 15.

Next, a second embodiment will be described with reference to FIGS. 4A, 4B, 4C, 4D. 4E and 4F. It should be noted that the same components and functions as in the above-described first embodiment are designated by the same reference numerals and their description is omitted.

In this embodiment, the sensor body 32 of the contact sensor 21 is provided in a plurality, e.g. three, where one (first) sensor body 32 is disposed at a widthwise-central front end portion of the main casing 15 and the other two (second) sensor bodies 32 are disposed at front-side oblique both side positions (in left-and-right 45° directions forward of the main casing 15) so as to be apart from each other with the sensor body 32 in the central portion interposed therebetween. Based on detection by the contact sensor 21, the control unit 26 detects a contact angle of the contact sensor 21 with an obstacle W (an angle between the traveling direction of the vacuum cleaner 11 (main casing 15) and the obstacle W) to set a swing angle for swing control of the directional change control in response to the detected contact angle. That is, the control unit 26 is configured to detect a contact angle of the contact sensor 21 with the obstacle W in response to whichever sensor body 32 detects contact of the bumper 31 with the obstacle W.

Figure 4A:
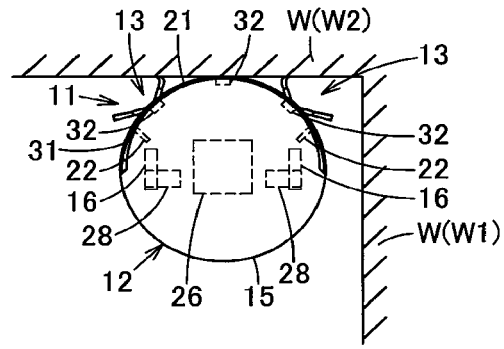
FIGS. 4A, 4B, 4C, 4D, 4E and 4F are explanatory plan views schematically showing directional change control of a vacuum cleaner including an autonomous traveling body according to a second embodiment, where

More specifically, when the contact sensor 21 comes into contact with an obstacle W2 extending in a direction orthogonally crossing an obstacle W1, as shown in FIG. 4A as an example, in other words, when the contact angle of the vacuum cleaner 11 (vacuum cleaner main body 12) with the obstacle W2 is 90° (generally 90°), the sensor body 32 in the central portion of the contact sensor 21 is pressed by the bumper 31. Accordingly, when the sensor body 32 in the central portion has detected contact of the bumper 31 (contact sensor 21) with the obstacle W2, the control unit 26 can decide that the contact angle of the contact sensor 21 with the obstacle W2 is 90° (generally 90°), i.e., the obstacle W2 extends in a direction of 90° (generally 90°) relative to the obstacle W1.

Figure 4B:
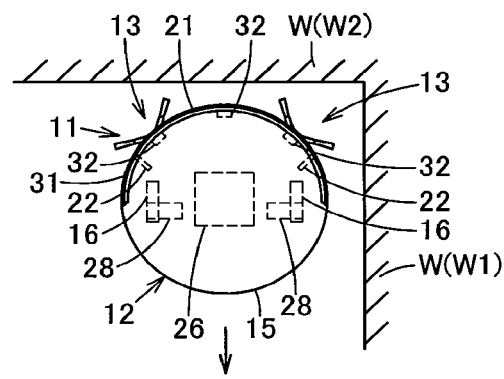
Figure 4C:
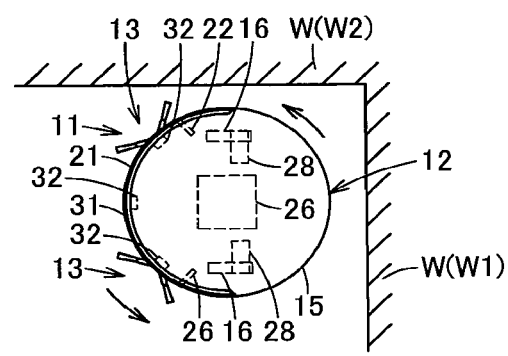
Figure 4D:
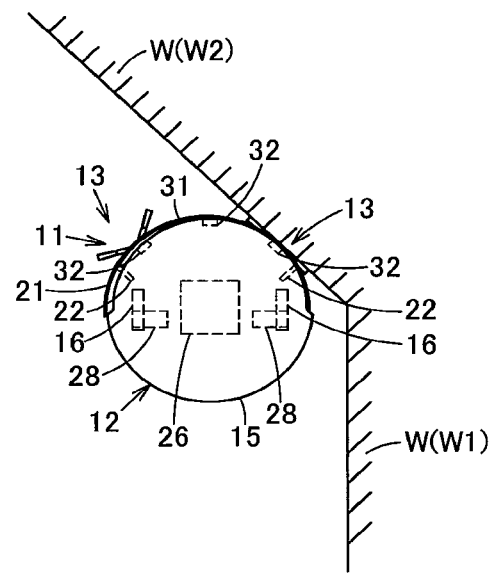

Also, for example as shown in FIG. 4D, when the contact sensor 21 comes into contact with an obstacle W2 extending in a direction of a skew, e.g. 45°, relative to an obstacle W1, i.e., when the contact angle of the vacuum cleaner 11 (vacuum cleaner main body 12) with the obstacle W2 is less than 90°, e.g., an acute angle of 45° or the like, the sensor body 32 placed on the obstacle W2 side (right side in FIG. 4D) of the contact sensor 21 is pressed by the bumper 31. Thus, when the sensor body 32 in the side portion has detected contact of the bumper 31 (contact sensor 21) with the obstacle W2, the control unit 26 can decide that the contact angle of the contact sensor 21 with the obstacle W2 is less than 90°, i.e., the obstacle W2 extends in a direction of less than 90° relative to the obstacle W1. Although FIGS. 4C to 4F show a case of traveling along the obstacle W1 located on the right side of the vacuum cleaner 11, a left-and-right reversed case is also similar to this.

In summary, depending on which one of the sensor bodies 32 of the contact sensor 21 has detected the contact of the bumper 31 with an obstacle W (obstacle W2), the control unit 26 can decide whether the contact angle of the contact sensor 21 with the obstacle W (obstacle W2) is 90° (generally 90°) or an acute angle.

Then, as shown in FIG. 4A, when it is detected that the contact angle of the contact sensor 21 with the obstacle W2 is 90° (generally 90°), the control unit 26, in the directional change control, controls the drive of the motors 28 so that the main casing 15 is retreated to a specified distance from the obstacle W2, as shown in FIG. 4B, and thereafter controls the drive of the motors 28 so that the main casing 15 swings to 90° as an example, as shown in FIG. 4C.

Figure 4E:
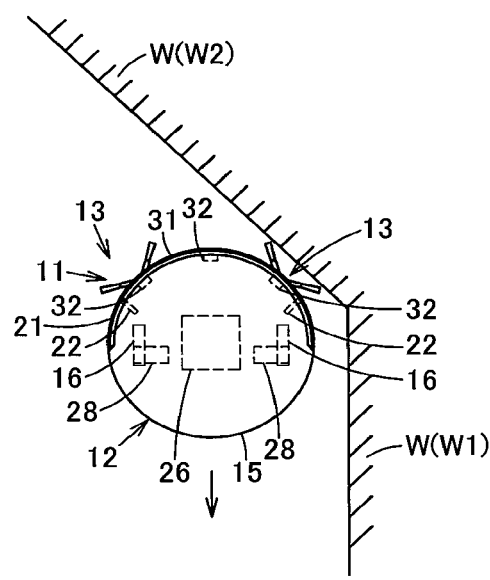
Figure 4F:
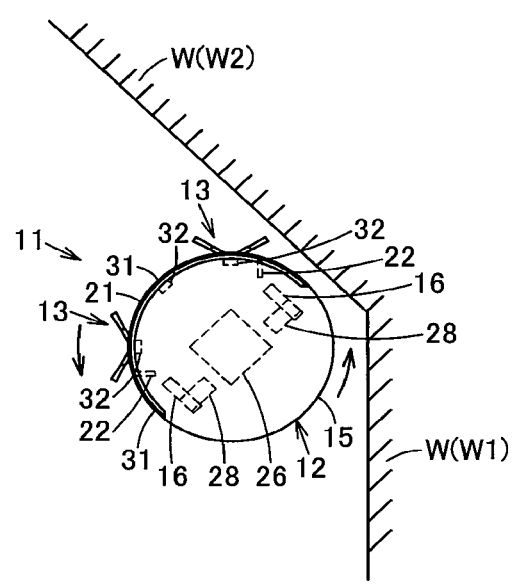

Also, when it is detected that the contact angle of the contact sensor 21 with the obstacle W2 is less than 90° as shown in FIG. 4D, the control unit 26, in the directional change control, controls the drive of the motors 28 so that the main casing 15 is retreated to a specified distance from the obstacle W2, as shown in FIG. 4E, and thereafter controls the drive of the motors 28 so that the main casing 15 swings to 45° as an example, as shown in FIG. 4F.

As described above, the control unit 26 detects a contact angle of the contact sensor 21 with the obstacle W based on detection by the contact sensor 21, and sets a swing angle differently for swing control in the directional change control based on the detected contact angle. Thus, the vacuum cleaner 11 (main casing 15) can be changed in direction with higher precision in response to the angle or direction of the obstacle W.

In addition, although the sensor bodies 32 are disposed at the central portion in the left and right direction and at 45° both-side positions in the above-described second embodiment, respectively, a multiplicity of sensor bodies 32 may be disposed in succession with smaller angular intervals.

They are also configured such that cases of a contact angle of 90° and cases of less than 90° are detected depending on whether the contact between the contact sensor 21 and the obstacle W has been detected by a sensor body 32 in the side portion other than the sensor body 32 in the central portion as an example. However, in addition to the above cases, it may also be configured such that a contact angle is detected more finely based on differences in contact detection timing among the sensor body 32 in the central portion and the sensor bodies 32 in the side portion. That is, on the condition that the shape of the bumper 31 and the placement of the sensor bodies 32 are so set that the detection timing becomes earlier the closer the sensor body 32 is to a contact position of the contact sensor 21 with an obstacle W, the control unit 26 is enabled to detect the contact angle more finely by comparing those differences in detection timing with a plurality of preset thresholds. In this case, by setting the swing angle for the directional change control more finely in response to a detected contact angle, the vacuum cleaner (main casing 15) can be traveled more smoothly and with higher precision.

Furthermore, although the contact sensor 21 is so configured as to include a plurality of sensor bodies 32 for one bumper 31, a contact sensor 21 having one or more sensor bodies 32 for one bumper 31 may be provided in plurality, as an example.

According to at least one of the above-described embodiments, since the contact sensor 21 detects a forward obstacle W, the vacuum cleaner 11 (main casing 15) can be brought proximate to the forward obstacle W (obstacle W2) until a position where the contact sensor comes into contact with the forward obstacle W (obstacle W2). Therefore, the side brushes 13 disposed in the main casing 15 can be moved to the cleaning-object surface, particularly a corner portion C, in the vicinity of the forward obstacle W (obstacle W2), and thereby the corner portion C, i.e. the cleaning-object surface in the vicinity of the obstacle W, can be cleaned effectively by the side brushes 13.

Figure 5A:
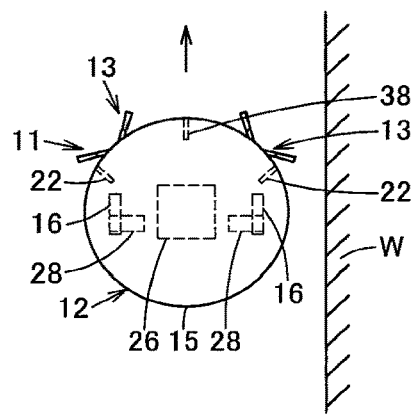
FIGS. 5A, 5B, and 5C are explanatory plan views schematically showing, in an order of FIGS. 5A to 5C, travel control and directional change control of a vacuum cleaner including an autonomous traveling body of a third embodiment.
Figure 5B:
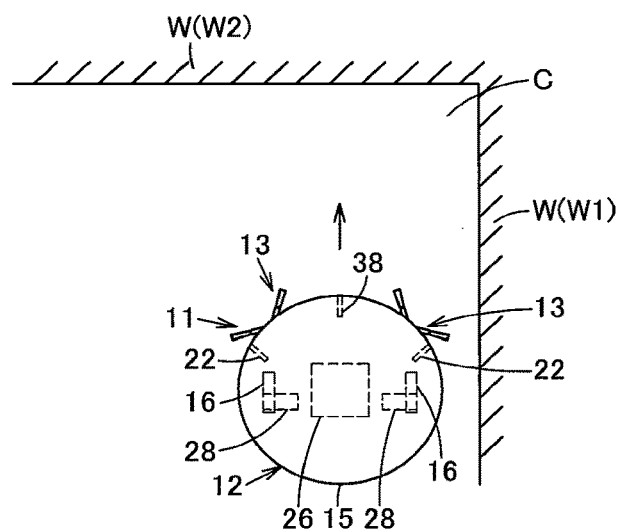
Figure 5C:
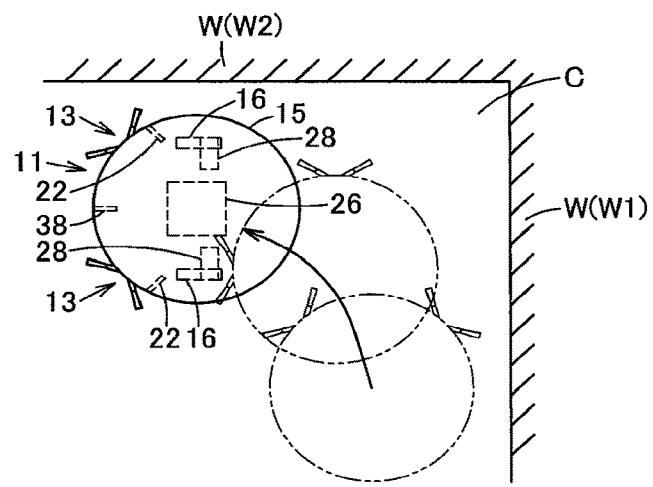

In the above-described individual embodiments, noncontact-type sensors may also be used as the object sensor (obstacle sensor) 38 as an object detection means as in a third embodiment shown in FIGS. 5A, 5B and 5C. In this case, as shown in FIGS. 5A to 5C, the vacuum cleaner 11 (main casing 15), after traveling to the vicinity of the obstacle W (obstacle W2) under travel control by the control unit 26, travels with its direction changed in units of a specified angle while disregarding distances detected by the distance measuring sensors 22 so as to travel along a circular-arc shape in the vicinity of the corner portion C without once stopping or retreating due to the directional change control by the control unit 26. Thus, the vacuum cleaner 11 (main casing 15) can be made to travel more smoothly.

Further, in the above-described individual embodiments, the distance measuring sensors 22 and the side brushes 13 may also be disposed on only one side of the main casing 15. In this case, the same functional effects as in each above-described embodiment can be produced on the condition that the distance measuring sensors 22 and the side brushes 13 are disposed on the same side and that the vacuum cleaner 11 (main casing 15) travels so that the side on which the distance measuring sensors 22 and the side brushes 13 are placed faces the obstacle W.

Also, the main casing 15, although provided in a columnar shape having a circular outer frame, may be formed into an arbitrary shape such as a polygonal shape.

Further, the above-described autonomous traveling body, although applied to the vacuum cleaner 11 above, may also be applied to, for example, monitoring robots for monitoring a room or the like.

Then, in at least one of the above-described embodiments, the control unit 26 includes the swing control in which, in the directional change control for making a change in advancing direction, which is the traveling direction of the vacuum cleaner 11 (main casing 15), from a direction along an obstacle W1 to a direction along an obstacle W2, when the contact sensor 21 or the object sensor 38 has detected an obstacle W (obstacle W2) forward of the main casing 15 in the travel control, the control unit 26, while disregarding distances detected by the distance measuring sensor 22, makes the main casing 15 swing to a specified swing angle. That is, during the directional change control, the control unit 26 has a fixed control section for swinging without reading detection values of the distance measuring sensors 22. Therefore, without involving use of multiple distance measuring sensors 22 or measuring an angle of the obstacle W (obstacle W2), the vacuum cleaner 11 (main casing 15) can be changed in direction along the obstacle W smoothly in a short amount of time while reducing misdetections of the obstacle W during the swinging. Thus, the vacuum cleaner 11 (main casing 15) can be made to travel smoothly along the obstacle W.

Also, a forward obstacle W (obstacle W2), if extending not in an orthogonal direction relative to a sideward obstacle W (obstacle W1) but in a crossing direction, can be detected by the contact sensor 21 or the object sensor 38 so that the vacuum cleaner 11 (main casing 15) is enabled to travel along the obstacle W (obstacle W2). Thus, the vacuum cleaner 11 (main casing 15) can autonomously travel with adaptation to rooms of various shapes or the like, thus allowing the room to be cleaned effectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

The travel control method for an autonomous traveling body as described above, wherein the directional change control includes retreat control for, when the distance between the main casing and the forward object has become a specified distance or less during the travel control, driving a motor so as to make the main casing retreat relative to the forward object.

The travel control method for an autonomous traveling body as described above, wherein the object sensor is a contact sensor for detecting an object by making contact with the object.

The travel control method for an autonomous traveling body as described above, wherein the swing angle in the swing control is an angle set in accordance with a position of the distance measuring sensor in the main casing.

The travel control method for an autonomous traveling body as described above, wherein a contact angle of the object sensor relative to an object is detected based on detection by the object sensor, and the swing angle in the swing control is set in response to the contact angle.

The travel control method for an autonomous traveling body as described above, wherein the main casing of the autonomous traveling body includes a side portion cleaning part for cleaning dust and dirt at least on a cleaning-object surface located sideward of the main casing.

The invention claimed is:

1. An autonomous traveling body comprising:
    a main casing;
    a driving wheel for making the main casing travel;
    a motor for driving the driving wheel;
    a distance measuring sensor for detecting a distance to an object located sideward of the main casing;
    an object sensor for detecting an object located forward of the main casing; and
    a control unit for controlling drive of the motor to make the main casing autonomously travel, wherein
    the control unit has modes of:
    travel control for, while a distance between the main casing and a sideward object detected by the distance measuring sensor is kept within a specified distance range, driving the motor so as to make the main casing travel along the object; and
    directional change control for, when an object forward of the main casing is detected by the object sensor during the travel control, driving the motor so as to make the main casing change in advancing direction along the detected forward object, and wherein
    the directional change control includes at least swing control for driving the motor so as to make the main casing swing to a specified swing angle while disregarding a distance detected by the distance measuring sensor and in the state, when a distance detected by the distance measuring sensor is not a specified constant value driving the motor to make the main casing further swing until the distance becomes the specified constant value.

2. The autonomous traveling body according to claim 1, wherein
    the directional change control includes retreat control for, when the distance between the main casing and the forward object has become a specified distance or less during the travel control, driving the motor so as to make the main casing retreat relative to the object.

3. The autonomous traveling body according to claim 1, wherein
    the object sensor is a contact sensor for detecting an object by making contact with the object.

4. The autonomous traveling body according to claim 1, wherein
    the swing angle in the swing control is an angle set in accordance with a position of the distance measuring sensor in the main casing.

5. The autonomous traveling body according to claim 3, wherein
    the control unit detects a contact angle of the object sensor with an object based on detection by the object sensor, and
    the swing angle in the swing control is set in accordance with the contact angle.

6. A vacuum cleaner comprising:
    the autonomous traveling body according to claim 1; and
    a side brush provided on the main casing of the autonomous traveling body and serving for cleaning dust and dirt at least on a cleaning-object surface located sideward of the main casing.

7. A travel control method for an autonomous traveling body for making a main casing autonomously travel, the method including modes of:
    travel control for, while a distance between a main casing and a sideward object detected by a distance measuring sensor is kept within a specified distance range, making the main casing travel along the object; and
    directional change control for, when an object forward of the main casing is detected by an object sensor during the travel control, making the main casing change in advancing direction along the detected forward object,
    wherein the directional change control includes swing control for making the main casing swing to a specified swing angle while disregarding a distance between the main casing and the sideward object detected by the distance measuring sensor and in the state, when a distance detected by the distance measuring sensor is not a specified constant value, making the main casing further swing until the distance becomes the specified constant value.

* * * * *